(12) United States Patent
Cheuk et al.

(10) Patent No.: US 10,561,160 B2
(45) Date of Patent: Feb. 18, 2020

(54) ANIMAL FOOD COMPOSITION AND PROCESS FOR PRODUCTION

(71) Applicant: Hill's Pet Nutrition, Inc., Topeka, KS (US)

(72) Inventors: Wai Lun Cheuk, Topeka, KS (US); Gary A. Semjenow, Topeka, KS (US)

(73) Assignee: Colgate-Palmolive Company, New York, NY (US)

( * ) Notice: Subject to any disclaimer, the term of this patent is extended or adjusted under 35 U.S.C. 154(b) by 665 days.

(21) Appl. No.: 14/652,775

(22) PCT Filed: Dec. 19, 2012

(86) PCT No.: PCT/US2012/070504
§ 371 (c)(1),
(2) Date: Jun. 16, 2015

(87) PCT Pub. No.: WO2014/196948
PCT Pub. Date: Dec. 11, 2014

(65) Prior Publication Data
US 2015/0327576 A1    Nov. 19, 2015

(51) Int. Cl.
*A23K 40/00* (2016.01)
*A23K 50/48* (2016.01)
(Continued)

(52) U.S. Cl.
CPC .............. *A23K 40/00* (2016.05); *A23K 50/48* (2016.05); *A23K 10/26* (2016.05); *A23K 10/30* (2016.05);
(Continued)

(58) Field of Classification Search
CPC ...... A23K 20/163; A23K 50/40; A23K 50/42; A23K 50/45; A23K 50/48; A23K 40/00;
(Continued)

(56) References Cited

U.S. PATENT DOCUMENTS

| 3,380,832 A | 4/1968 | Bone |
| 3,765,902 A | 10/1973 | Charter |

(Continued)

FOREIGN PATENT DOCUMENTS

| EP | 0154039 | 9/1985 |
| EP | 1282364 | 2/2003 |

(Continued)

OTHER PUBLICATIONS

Chinnaswamy et al., Relationship Between Amylose Content and Extrusion Expansion Properties of Corn Starches; Cereal Chem. 65(2): 138-143. (Year: 1988).*

(Continued)

*Primary Examiner* — Walter A Moore

(57) ABSTRACT

An animal food composition comprising a protein source and corn starch, wherein native high-amylose corn starch comprises at least 50% of the corn starch. The composition can be used to treat or prevent a food allergy in an animal. Also, a process for the preparation of an animal food composition comprising mixing a protein source, corn starch and water to form a mixture and heating the mixture; wherein native high-amylose corn starch comprises at least 50% of the corn starch.

19 Claims, 3 Drawing Sheets

(51) Int. Cl.
| | |
|---|---|
| A23K 20/174 | (2016.01) |
| A23K 10/26 | (2016.01) |
| A23K 20/163 | (2016.01) |
| A23K 20/147 | (2016.01) |
| A23K 20/158 | (2016.01) |
| A23K 10/30 | (2016.01) |

(52) U.S. Cl.
CPC .......... *A23K 20/147* (2016.05); *A23K 20/158* (2016.05); *A23K 20/163* (2016.05); *A23K 20/174* (2016.05)

(58) Field of Classification Search
CPC .. A23K 20/158; A23K 20/147; A23K 20/174; A23K 10/26; A23K 10/30
See application file for complete search history.

(56) References Cited

U.S. PATENT DOCUMENTS

| | | | |
|---|---|---|---|
| 4,044,158 | A | 8/1977 | Burkwall, Jr. |
| 4,251,556 | A | 2/1981 | Burkwall, Jr. et al. |
| 4,707,375 | A | 11/1987 | Buckley et al. |
| 5,281,432 | A | 1/1994 | Zallie et al. |
| 6,455,083 | B1* | 9/2002 | Wang .................. A01K 15/026 426/104 |
| 7,678,406 | B2 | 3/2010 | Heydtmann et al. |
| 2003/0072786 | A1 | 4/2003 | Hayek et al. |
| 2004/0131750 | A1* | 7/2004 | Russell ..................... A23J 1/02 426/643 |
| 2005/0084599 | A1 | 4/2005 | Umeda et al. |
| 2005/0118235 | A1* | 6/2005 | Yu ........................ A61K 31/195 424/442 |
| 2008/0280274 | A1 | 11/2008 | Friesen et al. |
| 2009/0054301 | A1* | 2/2009 | Dierking .................. A23J 3/30 514/1.1 |
| 2009/0148560 | A1 | 6/2009 | Shiba et al. |
| 2010/0112127 | A1* | 5/2010 | Chatel ..................... A21D 6/00 426/29 |
| 2010/0189843 | A1* | 7/2010 | Xie ........................ A23P 30/20 426/72 |
| 2010/0189870 | A1 | 7/2010 | Frohberg et al. |

FOREIGN PATENT DOCUMENTS

| | | |
|---|---|---|
| EP | 514480 | 3/2005 |
| JP | H8336373 | 12/1996 |
| JP | 2003532394 | 11/2003 |
| JP | 200595174 | 4/2005 |
| WO | WO 97/034592 | 9/1997 |
| WO | WO 01/084950 | 11/2001 |
| WO | 2006/130738 | 12/2006 |
| WO | WO 09/000557 | 12/2008 |

OTHER PUBLICATIONS

AAFCO, 2011, Association of American Feed Control Officials, Inc., Official Publication, pp. 146-155.

Cargill, 2009, Amylo Gel 03001 Product Information Sheet.
Cargill, 2012, Native Starches Molecular Structure website www.cargill.com/food/na/en/products/starches-derivatives/native-starches/mole . . . .
Creasy, 2011, "The calorie count for a boneless & skinless chicken breast," Livestrong.com/article/401237-the-calorie-count-for-a-boneless-skinless-chicken-breast/.
Gajda, Jr. et al., 2005, "Corn hybrid affects in vitro and in vivo measures of nutrient digestibility in dogs," J. Animal Science 83:160-171.
Hegenbart, 1996, "Understanding starch functionality," www.FoodProductDesign.com/articles/1996/01/understanding-starch-functionality.aspx.
Hill's Pet Nutrition, Inc., 2012, Hill's Prescription Diet Canine z/d Low Allergen—composition from website.
Hill's Pet Nutrition, Inc., 2012, Hill's Prescription Diet Canine z/d ULTRA allergen-free—composition from website.
International Search Report and Written Opinion in International Application No. PCT/US2012/070504, dated Oct. 30, 2014.
Yang Sun, ed., 2010, "Processing of Green Dried Meat Slices," Green Food Processing Technology, pp. 311 and 313, Beijing: Science Press, 1st edition.
Corresponding Chinese Office Action and Search Report dated Jul. 26, 2016.
Brazil sets requirement for content ranges of moisture and protein in chicken breast and drumstick, pp. 1-2, http://news.foodmate.net/2010/12/173124.html, Dec. 12, 2010.
Erickson, 2006, "Corn Starch," Corn Refiners Association publication.
Zhang et al., 2003, "A three component interaction among starch, protein, and free fatty acids revealed by pasting profiles," J. Agricultural and Food Chemistry 51:2797-2800.
Cargill, 2012, "AmyloGel 03001I" Technical Specification.
Cargill, 2012, Letter at the attention of Hill's Pet Nutrition, Inc.
Cave, 2006, "Hydrolyzed protein diets for dogs and cats," Veterinary Clinics Small Animal Practice 36(6):1251-1268.
Garzino, 2019, Declaration in Opposition against EP 2934173 (Annex 2) filed by Opponent.
Hill's Pet Nutrition, 2012, Corn Starch, High Amylose Ingredient specification.
Hill's Pet Nutrition, 2018, A set of three experimental RVA curves.
Kumar, 2004, "Enzymatically modified soy protein part I: Thermal behaviour," J. of Thermal Analysis and Calorimetry 75:727-738.
Pizzagalli, 2019, Declaration in Opposition against EP 2934173 (Annex 1) filed by Opponent.
Semjenow, 2018, Declaration of Gary A. Semjenow in the matter of an Opposition against EP 2934173B1 of Hill's Pet Nutrition, Inc. filed by Mars, Inc.
Semjenow, 2019, Second Declaration of Gary A. Semjenow in the matter of an Opposition against EP 2934173B1 of Hill's Pet Nutrition, Inc. filed by Mars, Inc.
Technidog, 2011, website Ingredients list https://www.technidog.com/.
Technidog, 2019, "Hill's canine Z/D Food sensitivities" website https://www.technidog.com/.
Technidog, 2019, "Hill's Z/D: Croquette Contre les Allergies Alimentares du Chien," website https://www.technidog.com/.

\* cited by examiner

ANIMAL FOOD COMPOSITION AND PROCESS FOR PRODUCTION

BACKGROUND OF THE INVENTION

Production of animal food compositions typically includes mixing constituent ingredients together and heating to an elevated temperature to cook the ingredients. Conventional apparatus is available for such a process and may typically involve the use of a screwthread conveyor apparatus for heating and mixing the ingredients. Metered portions of cooked composition from the apparatus may be deposited into cans for subsequent sealing, sterilization and cooling.

The heating step in the production process gives rise to changes in the viscosity of the composition which can be difficult to control and which can lead to product variability. The present invention aims to provide improvements in the food composition product and in the process for its production.

BRIEF SUMMARY OF THE INVENTION

In a first aspect, the present invention provides an animal food composition comprising a protein source and a corn starch, wherein native high-amylose corn starch comprises at least 50% by weight of the corn starch.

It has been found that, when the constituent components of the food composition comprise a protein source such as poultry liver hydrolysate and a conventional starch, during the heating step highly viscous material can be produced in the apparatus. This highly viscous material can give rise to non-uniform mixing and/or flow through the apparatus. As a result, the texture of the final food composition product can vary from batch to batch. In addition, the final animal food product can be highly sensitive to elevated temperature, becoming insufficiently viscous and being perceived to be too runny by animal owners. This can be a problem when the product has been stored in warm conditions, for example during shipping.

It has surprisingly been found that if at least 50% by weight of the corn starch is replaced by native high-amylose corn starch, the sensitivity of the product to elevated temperature is reduced or eliminated. Additionally, the final viscosity of the food product is considerably higher. As a result, animal food compositions according to the invention may be produced with a texture which is more acceptable to consumers and without the variation hitherto experienced.

The principal constituents of starch are amylose and amylopectin. In conventional starches, there is more amylopectin than amylose. Conventional corn starch has an amylose content of around 25% by weight. This is comparable to the amylose content of wheat starch and higher than tapioca starch, which has an amylose content of around 17%. The amylopectin makes up the balance of the weight. High-amylose corn starch typically has an amylose content of from about 50 to about 70 wt % based on the total weight of the composition on a dry matter basis. The corresponding amylopectin content is from about 30 to about 50 wt % based on the total weight of the composition on a dry matter basis. High-amylose corn starch may be prepared in a number of different ways. For example, chemical treatment of starch preparations is possible, for example to derivatize the starch by a chemical cross-linking reaction or oxidation reaction or some other form of derivatization. These treatments do not produce a native high-amylose corn starch. For the purpose of the present invention, a native high-amylose corn starch is one which has not been derivatized by chemical or enzymatic means and typically has an amylose content of from about 50 wt % to about 70 wt % based on the total weight of the composition on a dry matter basis. Derivatized corn starch is undesirable in the present invention in part because it can have poor digestibility, potentially resulting in diarrhoea in animals.

In one embodiment, the native high-amylose corn starch has an amylose content of around 50%.

According to the invention, the animal food composition comprises corn starch. Typically, on a dry weight basis, the composition comprises corn starch in an amount of from 40 to 70 wt % based on the total weight of the composition on a dry matter basis. Optionally, the composition comprises corn starch in an amount from 45 to 60 wt %, optionally from 50 to 55 wt % based on the total weight of the composition on a dry matter basis. Of this amount of corn starch in the composition, at least about 50% by weight is the native high-amylose corn starch. The rest of the starch is typically conventional corn starch. It is possible to include a higher proportion of native high-amylose corn starch up to 100% so that all of the corn starch comprises the native high-amylose corn starch. Native high-amylose corn starch is significantly more expensive than conventional corn starch and so the amount of the native high-amylose corn starch to provide the improved properties described herein has to be balanced against the cost. Where the high-amylose corn starch is present in an amount below 50% by weight of the total corn starch it is found that the composition does not display the improvement seen at the level of 50% by weight or more.

The protein source of the invention may arise from a variety of sources known by those skilled in the art, including plant sources, animal sources or both. Animal sources include, for example, meat, meat by-products, dairy products and eggs. Meats include, for example, the flesh of poultry, fish and mammals such as cattle, pigs, sheep and goats. Meat by-products include, for example, lungs, kidneys, brain, livers, stomachs and intestines (free of all or essentially all of their contents). The protein source can comprise intact protein, partially hydrolysed protein or completely or almost completely hydrolysed protein. The protein source does not include supplementary amino acids, which may be added as additional nutrient components.

In one embodiment, poultry liver hydrolysate may be used as the protein source in the present invention to reduce or eliminate food allergens from the food composition. Dairy products, beef and plant proteins can cause food hypersensitivity in dogs. In one embodiment, the protein content of the composition consists essentially of the poultry liver hydrolysate.

In one embodiment, the protein source comprises at least 90% of the protein content of the composition. In one embodiment, the composition comprises protein source in an amount from 20 to 45 wt % based on the total weight of the composition on a dry matter basis. In another embodiment, the composition comprises the protein source in an amount from 25 to 40 wt % and may be 30 to 35 wt % based on the total weight of the composition on a dry matter basis.

The animal food compositions according to the invention may further comprise a source of dietary fiber which may be obtained from a variety of sources such as vegetable fiber sources. These vegetable fiber sources include cellulose, beet pulp, peanut hulls and soy fiber. In one arrangement, the source of dietary fiber is cellulose.

The composition may comprise the source of dietary fiber in an amount from 5 to 8 wt % based on the total weight of the composition on a dry matter basis. In particular the composition comprises the source of dietary fiber in an amount of 6.5 to 7 wt % based on the total weight of the composition on a dry matter basis.

The animal food composition may further comprise an edible oil. An edible oil may be any oil or fat suitable for use in an animal food composition and includes animal fat, fish oil and vegetable oil. In one arrangement, the edible oil is soybean oil. The composition comprises edible oil in an amount from 3.5 to 5 wt % based on the total weight of the composition on a dry matter basis. In particular, the composition comprises edible oil in an amount of 4.2 to 4.5 wt % based on the total weight of the composition on a dry matter basis.

The animal food composition may further comprise one or more nutrient components which may be selected from minerals, vitamins and supplementary amino acids. Vitamins and minerals can be included in amounts required to avoid deficiency and maintain health. These amounts are readily available in the art. The Official Publication of the Association of American Feed Control Officials (AAFCO) provides recommended amounts of such nutrients for dogs and cats. See Association of American Feed Control Officials, Inc., Official publication, pp. 146-155 (2011). Vitamins generally useful as food additives include vitamin A, vitamin B1, vitamin B2, vitamin B6, vitamin B 12, vitamin D, biotin, vitamin K, folic acid, inositol, niacin, and pantothenic acid. Minerals and trace elements useful as food additives include calcium, phosphorus, sodium, potassium, magnesium, copper, zinc, chloride, iron, selenium, iodine, and iron.

The animal composition may be prepared in the form of a moist food. Moist food refers here to food which has a moisture content of about 25 to 90% or greater.

The animal food composition of the invention may be formulated for a companion animal. Companion animals include canines and felines. In one arrangement, the food composition according to the invention is for a canine.

The animal food composition according to the invention may be a hypoallergenic composition which is, for example, low in allergens or substantially free of allergens. Where a hypoallergenic composition is required, each of the components that go to make up the composition must themselves be essentially free of allergens. Poultry liver hydrolysate is such a food component. In one arrangement the protein source consists essentially of poultry liver hydrolysate. The composition according to the invention may be used in the treatment or prevention of food allergy in an animal.

Accordingly, in a second aspect, the present invention provides a method for treating or preventing food allergy in an animal. The method comprises feeding the animal with a composition as described herein in an amount effective to treat or prevent the food allergy.

In a further aspect, the present invention provides a process for the preparation of an animal food composition, which comprises mixing a protein source, corn starch and water to form a mixture, heating the mixture; wherein native high-amylose corn starch comprises at least 50% by weight of the corn starch.

Typically, the mixture is heated to a temperature of from 70 to 90° C. In one arrangement, the mixture is heated to a temperature of around 82° C. Heating the mixture causes the viscosity of the composition to increase. As described in further detail below, the rate at which compositions according to the invention increase in viscosity is lower than the rate observed with conventional components and a smoother rate of change of viscosity over time is observed. As a result, highly viscous material that might otherwise block filling equipment is not formed in amounts to cause non-uniform mixing or poor flow through the apparatus.

According to the process of the invention, the heated mixture is typically kept at a temperature of from about 70° C. to about 80° C. for a period to cook the components. This may be from about 10 to about 15 minutes. During this period the components of the heated mixture are allowed to cook. The final value of the viscosity is lower than found using conventional components. The process according to the invention is typically performed in a screwthread conveyor apparatus which is conventional in the art of food preparation. Initial components may be mixed in a vessel suitable for heating. While blending the components, heating of the mixture may be effected by any suitable means such as direct steam injection or using a vessel filled with a heat exchanger.

The process according to the invention may also be prepared in a batch process.

At the end of the process the composition may be used to fill containers such as cans. In one arrangement, the composition is delivered from the apparatus, typically in metered portions. The containers are sealed and conventional equipment is used to sterilize the contents. Commercial sterilization is usually accomplished by heating to temperatures of greater than about 120° C. for an appropriate time depending on the temperature used and the composition.

BRIEF DESCRIPTION OF THE DRAWINGS

The present invention will now be described by way of example only with reference to the following examples and the attached drawings, in which.

DETAILED DESCRIPTION OF THE INVENTION

Example 1

Compositions

Table 1 shows the composition of the animal formulations used in the following examples. The formulations have the same ingredients, but differ in the amount of conventional corn: native high-amylose corn starch present in the corn starch as shown in Table 2.

TABLE 1

| Ingredient Name | Formula (%) | Dry Weight | Formula (%, dry matter basis) |
|---|---|---|---|
| Water, Potable | 47.7 | 0 | |
| Chicken livers, hydrolysed, frozen | 33.8 | 64.8 | 32.3 |
| Corn starch | 14.4 | 27.6 | 52.3 |
| Cellulose, powdered | 1.7 | 3.3 | 6.9 |
| Soybean oil | 1.1 | 2.1 | 4.4 |
| Minerals | 1.0 | 1.9 | 2.9 |
| Vitamins and amino acids | 0.3 | 0.6 | 1.2 |

TABLE 2

|  | Conventional Corn Starch (%) | Native High-Amylose Corn Starch (%) |
|---|---|---|
| Control Sample | 100 | 0 |
| Test Sample A | 90 | 10 |
| Test Sample B | 80 | 20 |
| Test Sample C | 70 | 30 |
| Test Sample D | 50 | 50 |

Example 2

Rheological Analysis of Starches

A rheological examination of the mixtures of ingredients which may be included in the food composition was performed using a rapid visco analyser (RVA). As described in further detail below, RVA analysis results in a plot of viscosity against time over a time course during which the temperature of the sample being measured changes. The temperature of the sample is also plotted on the same graph against time. It is therefore possible to compare the viscosity behaviour of a sample against the temperature of the sample on the same graph.

Figure 1:
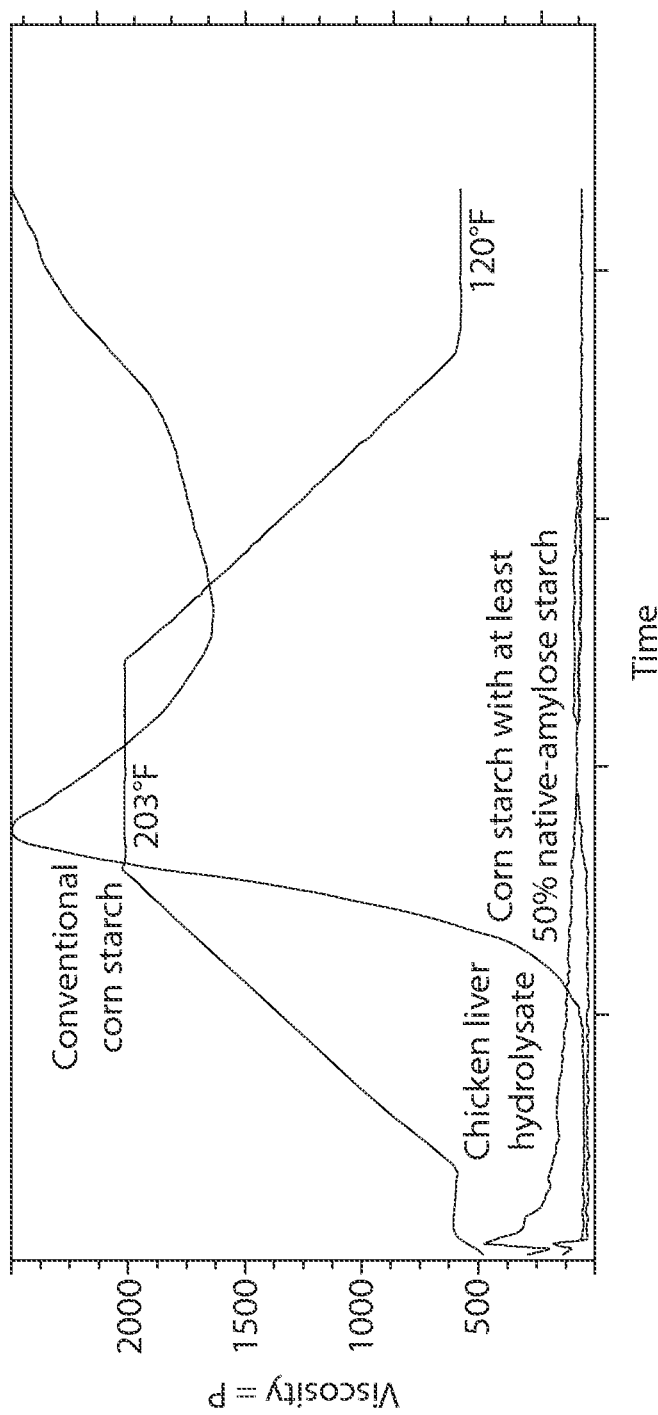
FIG. 1 is an RVA graph comparing conventional corn starch, corn starch according to the invention and chicken liver hydrolysate.

RVA analysis was performed on conventional corn starch, a sample of a native high-amylose corn starch having an amylose content of around 50% and a sample of chicken liver hydrolysate. The RVA analysis was performed using a rapid visco analyser. The results are presented in FIG. 1. Starting at ambient temperature, the temperature was eventually increased linearly to reach a maximum temperature of 95° C. The sample was cooled back down to around 49° C. It will be apparent from the plot of viscosity against time that the chicken liver hydrolysate and the native high-amylose corn starch had very low viscosity over most of the period of temperature changes. The chicken liver hydrolysate started at a higher viscosity than the native high-amylose corn starch but both were low by the end of the time course. In contrast, the conventional corn starch increased to a maximum viscosity of around 2500 centipoise, decreasing to a viscosity of around 1600 centipoise before increasing again.

Thus, while both types of starch had a water-like viscosity at ambient temperature, the behaviour of the conventional corn starch changed dramatically upon heating.

Example 3

Rheological Analysis of Animal Food Compositions

RVA analysis was performed on the compositions in Table 2 so as to compare the effect of animal food compositions using different starch mixes.

Figure 2:
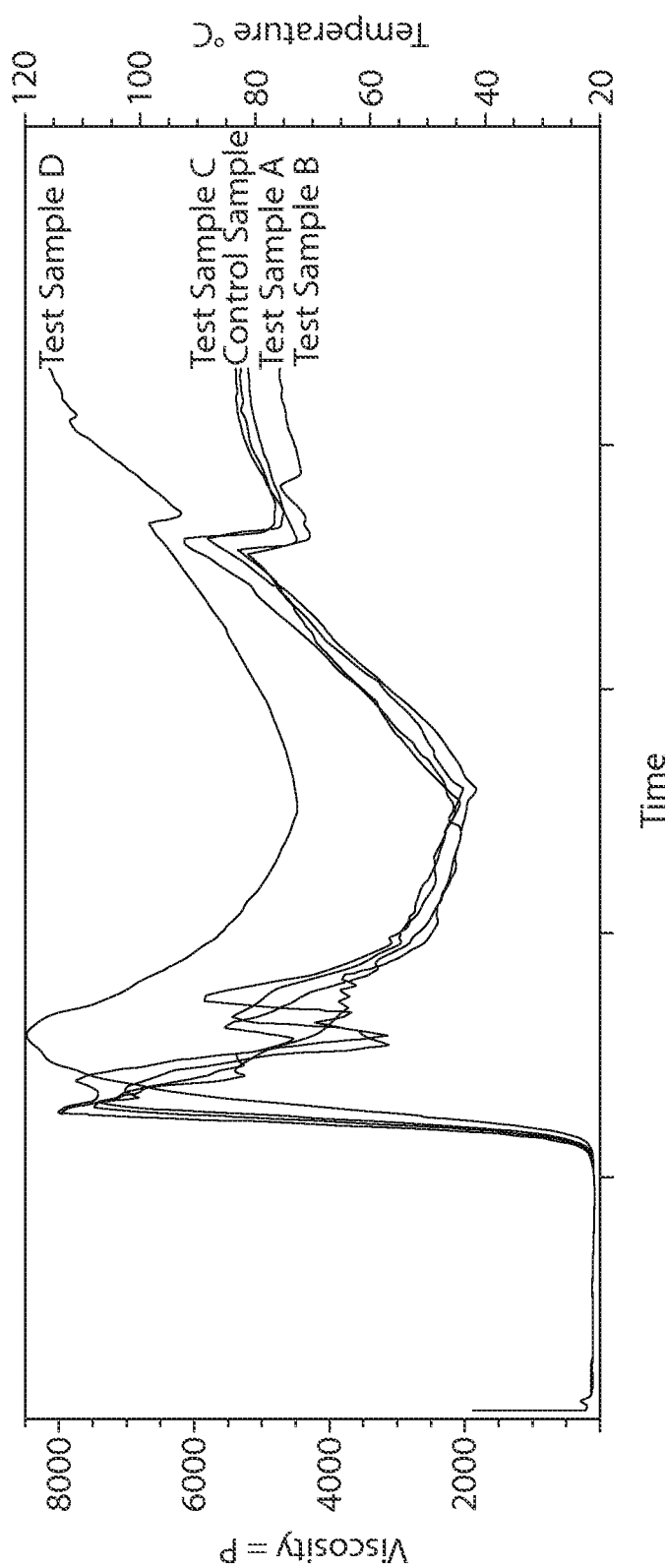
FIG. 2 is an RVA graph comparing compositions of the invention with conventional and comparative example compositions.

As shown in FIG. 2, Test Samples A, B and C all behaved similarly to the control example in the RVA analysis. All had rapid increases in viscosity once the threshold temperature was reached at which the starch forms a paste. After an initial viscosity which is extremely low, at around 80° C. the viscosity rises very rapidly within a period of the order of 1 minute to a value in excess of 7000 centipoise. Over the time course the viscosity is reduced to a trough value of around 2000 centipoise, before increasing again to a final viscosity in the order of 5000 centipoise.

In contrast, Test Sample D developed high viscosity at a much slower rate, giving rise to smooth curve with a peak in excess of 8000 centipoise. The curve decayed to a trough at a value slightly lower than 5000 centipoise before rising again to a maximum value of 8000 centipoise. This behaviour is markedly different from any of the other samples containing a lower proportion of native high-amylose corn starch.

Example 4

Rheological Analysis of Heated Starches

Figure 3:
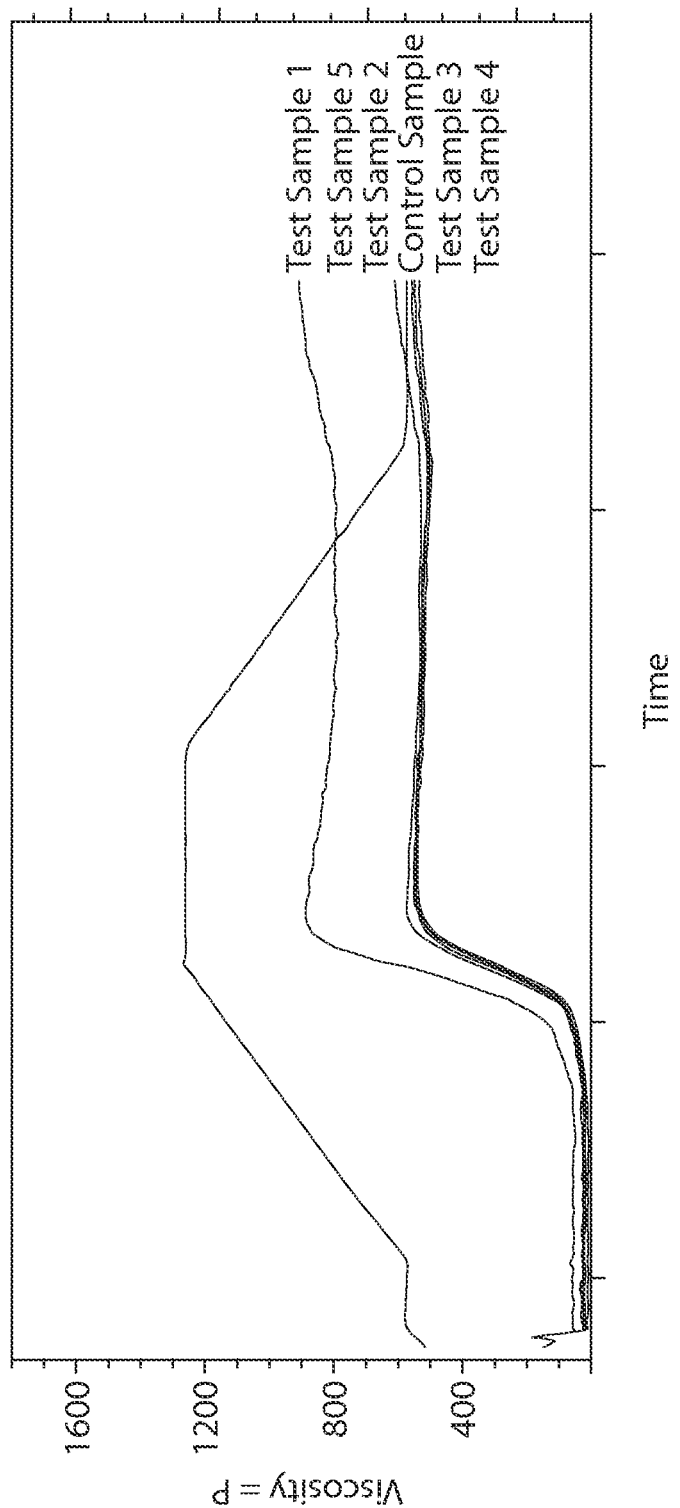
FIG. 3 is an RVA graph comparing starch samples taken at different times from a heating experiment.

An RVA analysis of Test Sample D taken at different times during heating was compared with the Control Sample. The results are presented in FIG. 3. The Control Sample showed a similar profile to that in FIG. 1. Test Sample D was measured at the following times; 08.55 (Test Sample 1), 09.32 (Test Sample 2), 10.01 (Test Sample 3), 10.35 (Test Sample 4) and 10.45 (Test Sample 5.) After Test Sample 1, Test Samples 2-5 showed consistent behaviour. Test Samples 2-5 demonstrate consistent behavior indicating reproducibility in a continuous process over a 2 hour period.

Example 5

Production of Animal Food Composition

The ingredients specified in Table 1 are mixed together and put into a screwthread apparatus or batch mixer. According to the invention, the composition of the corn starch component is 50% conventional corn starch and 50% native high-amylose corn starch. This constitutes a grain component which is added to the mixture. The trace solid components which are the minerals, vitamins and supplementary amino acids in Table 1 are added along with the grain component. Chicken liver hydrolysate is added to the mixture as a meat component and potable water and soybean oil are added.

The screwthread apparatus comprises a trough approximately 15 feet in length in which is disposed a screwthread for conveying the mixture through the apparatus. Direct steam injection is used to heat up the mixture in the apparatus.

The mixture in the apparatus reaches a temperature of around 82° C. and is conveyed through the screwthread apparatus for a period of 10 to 15 minutes. The cooked mixture is released from the apparatus by pumping and is metered into portions into cans. A lid is applied to each can and the can is then retorted in a conventional retort sterilizer at a temperature of approximately 120° C.

We claim:

1. An animal food composition comprising a protein source, a source of dietary fiber, an edible oil, minerals, vitamins and amino acids, and corn starch,
    wherein the source of dietary fiber is cellulose and is present in an amount of 6.9 wt %, based on the total weight of the composition on a dry matter basis,
    wherein the edible oil is soybean oil and is present in an amount of 4.4 wt %, based on a total weight of the composition on a dry matter basis,
    wherein the minerals are present in an amount of 2.9 wt %, based on a total weight of the composition on a dry matter basis,
    wherein the vitamins and amino acids are present in an amount of 1.2 wt %, based on a total weight of the composition on a dry matter basis,
    wherein native high-amylose corn starch comprises 50% by weight of the corn starch, wherein the corn starch is present in an amount of 52.3 wt %, based on the total weight of the composition on a dry matter basis, wherein the protein source is chicken liver hydrolysate and is present in an amount of 32.3 wt %, based on the total weight of the composition on a dry matter basis, wherein the native high-amylose corn starch has an amylose content of about 50 wt %, based on the total weight of the composition on a dry matter basis, wherein the animal food composition has a moisture content of 47.7%, wherein the animal food composition has a final viscosity of about 8,000 centipoise (cP), and wherein a temperature sensitivity of the animal food composition when exposed to increasing temperatures is relatively lower as compared to an animal food composition comprising 52.3 wt % corn starch based on the total weight of the composition on a dry matter basis, wherein native high-amylose corn starch comprises less than 30 wt % by weight of the corn starch.

2. The animal food composition according to claim 1, wherein the protein source comprises at least 90% of a protein content of the composition.

3. The animal food composition according to claim 1, which is in the form of a moist food.

4. The animal food composition according to claim 1, which is for a companion animal.

5. The animal food composition according to claim 4, which is for a canine.

6. The animal food composition according to claim 1, which is a hypoallergenic composition.

7. The animal food composition of claim 1, wherein the animal food composition consists of water, the protein source, the corn starch, the source of dietary fiber, the edible oil, the minerals, and the vitamins and amino acids.

8. A process for the preparation of the animal food composition of claim 1, the process comprising:
mixing the protein source, the corn starch, and water to form a mixture; and
heating the mixture.

9. A process according to claim 8, wherein the mixture is heated to a temperature of from 70 to 90° C.

10. A process according to claim 9, wherein the mixture is heated to a temperature of 82° C.

11. A process according to claim 8, wherein the heated mixture is kept at a temperature of from 70° C. to 80° C. for a time of from 10 to 15 minutes.

12. A process according to claim 8, which is performed in a screw thread conveyor apparatus.

13. A process according to claim 12, wherein the composition is delivered from the apparatus in metered portions.

14. A process according to claim 8, which is performed in a batch process.

15. A method for treating or preventing food allergy in an animal in need of such treatment, which comprises feeding the animal with a composition according to claim 6 in an amount effective to treat or prevent the food allergy.

16. An animal food composition comprising a protein source, a source of dietary fiber, an edible oil, minerals, vitamins and amino acids, and corn starch, wherein the source of dietary fiber is cellulose and is present in an amount of 6.9 wt %, based on the total weight of the composition on a dry matter basis, wherein the edible oil is soybean oil and is present in an amount of 4.4 wt %, based on a total weight of the composition on a dry matter basis, wherein the minerals are present in an amount of 2.9 wt %, based on a total weight of the composition on a dry matter basis, wherein the vitamins and amino acids are present in an amount of 1.2 wt %, based on a total weight of the composition on a dry matter basis, wherein native high-amylose corn starch comprises 50% by weight of the corn starch, wherein the corn starch is present in an amount of 52.3 wt %, based on the total weight of the composition on a dry matter basis, wherein the protein source is chicken liver hydrolysate and is present in an amount of 32.3 wt %, based on the total weight of the composition on a dry matter basis, wherein the animal food composition has a moisture content of 47.7%, based on a total weight of the composition, wherein the native high-amylose corn starch has an amylose content of about 50 wt %, based on the total weight of the composition on a dry matter basis, and wherein a temperature sensitivity of the animal food composition when exposed to increasing temperatures is relatively lower as compared to a comparative animal food composition comprising a protein source and corn starch in the same amounts as the animal food composition, wherein the protein source of the comparative food composition is chicken liver hydrolysate, wherein the corn starch of the comparative animal food composition comprises native high-amylose corn starch in an amount of 30 wt % or less by weight of the corn starch.

17. The animal food composition of claim 16, wherein the animal food composition has a final viscosity of about 8,000 centipoise (cP).

18. The animal food composition of claim 16, wherein the comparative animal food composition includes corn starch in an amount of 52.3 wt %, based on the total weight of the composition on a dry matter basis.

19. The animal food composition of claim 18, wherein the animal food composition has a final viscosity of about 8,000 centipoise (cP).

* * * * *

UNITED STATES PATENT AND TRADEMARK OFFICE
CERTIFICATE OF CORRECTION

PATENT NO. : 10,561,160 B2  
APPLICATION NO. : 14/652775  
DATED : February 18, 2020  
INVENTOR(S) : Wai Lun Cheuk et al.

Page 1 of 1

It is certified that error appears in the above-identified patent and that said Letters Patent is hereby corrected as shown below:

On the Title Page

On Page 2, under "FOREIGN PATENT DOCUMENTS", Line 1, delete "514480" and insert -- 1514480 --, therefor.

On Page 2, in Column 2, Line 20, delete "Sun," and insert -- Jun, --, therefor.

Signed and Sealed this  
Twenty-third Day of June, 2020

Andrei Iancu  
*Director of the United States Patent and Trademark Office*